United States Patent
Banatre et al.

(10) Patent No.: US 8,392,521 B2
(45) Date of Patent: Mar. 5, 2013

(54) DEVICE AND METHOD FOR MANAGING DATA BETWEEN COMMUNICATION FACILITIES TO OBTAIN A MOBILE SERVICE

(75) Inventors: Michel Banatre, La Fresnais (FR); Gilbert Cabillic, Brece (FR); Paul Couderc, Plouharnel (FR)

(73) Assignee: Inria Institut National de Recherche en Informatique et en Automatique, Cedex (FR)

( * ) Notice: Subject to any disclaimer, the term of this patent is extended or adjusted under 35 U.S.C. 154(b) by 682 days.

(21) Appl. No.: 10/531,291

(22) PCT Filed: Oct. 10, 2003

(86) PCT No.: PCT/FR03/02997
§ 371 (c)(1),
(2), (4) Date: Apr. 14, 2005

(87) PCT Pub. No.: WO2004/043035
PCT Pub. Date: May 21, 2004

(65) Prior Publication Data
US 2006/0010237 A1 Jan. 12, 2006

(30) Foreign Application Priority Data
Oct. 25, 2002 (FR) ...................................... 02 13387

(51) Int. Cl.
*G06F 15/16* (2006.01)
(52) U.S. Cl. ........................................ 709/217; 709/206
(58) Field of Classification Search .................. 709/206, 709/217, 218, 219
See application file for complete search history.

(56) References Cited

U.S. PATENT DOCUMENTS
(Continued)

FOREIGN PATENT DOCUMENTS
EP     1 085 696 A    3/2001
JP     10 011699 A    4/1998
(Continued)

OTHER PUBLICATIONS

English translation of JP 2002-042299A, Translated on Jul. 14, 2011.*

(Continued)

*Primary Examiner* — Jeong S Park
(74) *Attorney, Agent, or Firm* — Foley & Lardner LLP

(57) ABSTRACT

The invention concerns a device dedicated to the management of data between at least one user mobile station (MS) equipped with a communication module (1), stationary terminals (3) associated with at least one service, and a plurality of mobile service means (8) equipped with a communication module (9) and adapted to ensure said service. Said device comprises i) first control means (2) designed to be implanted in the user mobile station (MS) and adapted, upon the user's instruction to generate a primary request including data defining a request for obtaining a service selected at a terminal (3) installed proximate to the mobile station (MS) and associated with the service, ii) second control means (7) adapted, upon reception of a primary request, to generate a secondary request including data defining a request for ensuring the selected'service at the terminal (3), and iii) third control means (10) implanted in each of the mobile service means (8) and adapted, upon reception of a secondary request by the associated communication module (9), to order stoppage of the associated mobile service means (8) at the terminal (3), so as to ensure the service requested by the user of the mobile station (MS).

28 Claims, 6 Drawing Sheets

U.S. PATENT DOCUMENTS

Figure 1A:
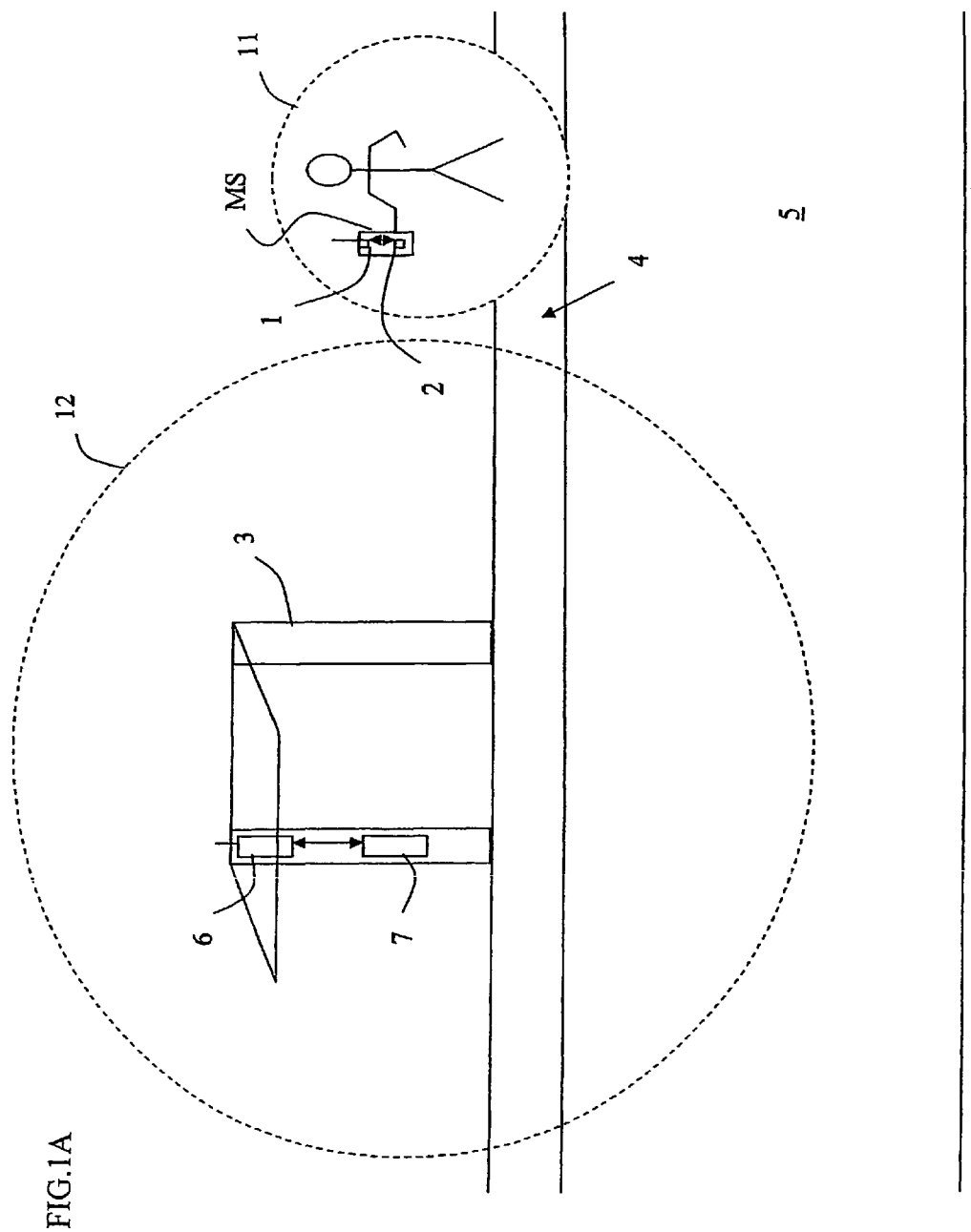

| | | | |
|---|---|---|---|
| 5,611,050 A | 3/1997 | Goldstein et al. | |
| 2001/0053669 A1* | 12/2001 | Kado et al. | 455/7 |
| 2002/0062192 A1* | 5/2002 | Saraga et al. | 701/207 |
| 2002/0129170 A1* | 9/2002 | Moore et al. | 709/249 |
| 2002/0168943 A1* | 11/2002 | Callaway et al. | 455/67.1 |
| 2005/0180343 A1* | 8/2005 | Van Valkenburg | 370/310 |

FOREIGN PATENT DOCUMENTS

| | | | |
|---|---|---|---|
| JP | 2002042299 A | * | 2/2002 |
| WO | WO 02 078381 A | | 10/2002 |

OTHER PUBLICATIONS

Banâtre, M., et al., "Ambient computing applications: an experience with the SPREAD approach" Proceedings of the 36$^{th}$ Hawaii Intl. Conf. on System Sci. (HICSS' 03) 'Online! pp. 291-299 (Jan. 9, 2003).

Murphy, A. L., et al., "LIME: a middleware for physical and logical mobility" Proceedings 21$^{st}$ Intl. Conf. on Distributed Computing Systems, pp. 524-533 (Apr. 16-19, 2001).

* cited by examiner

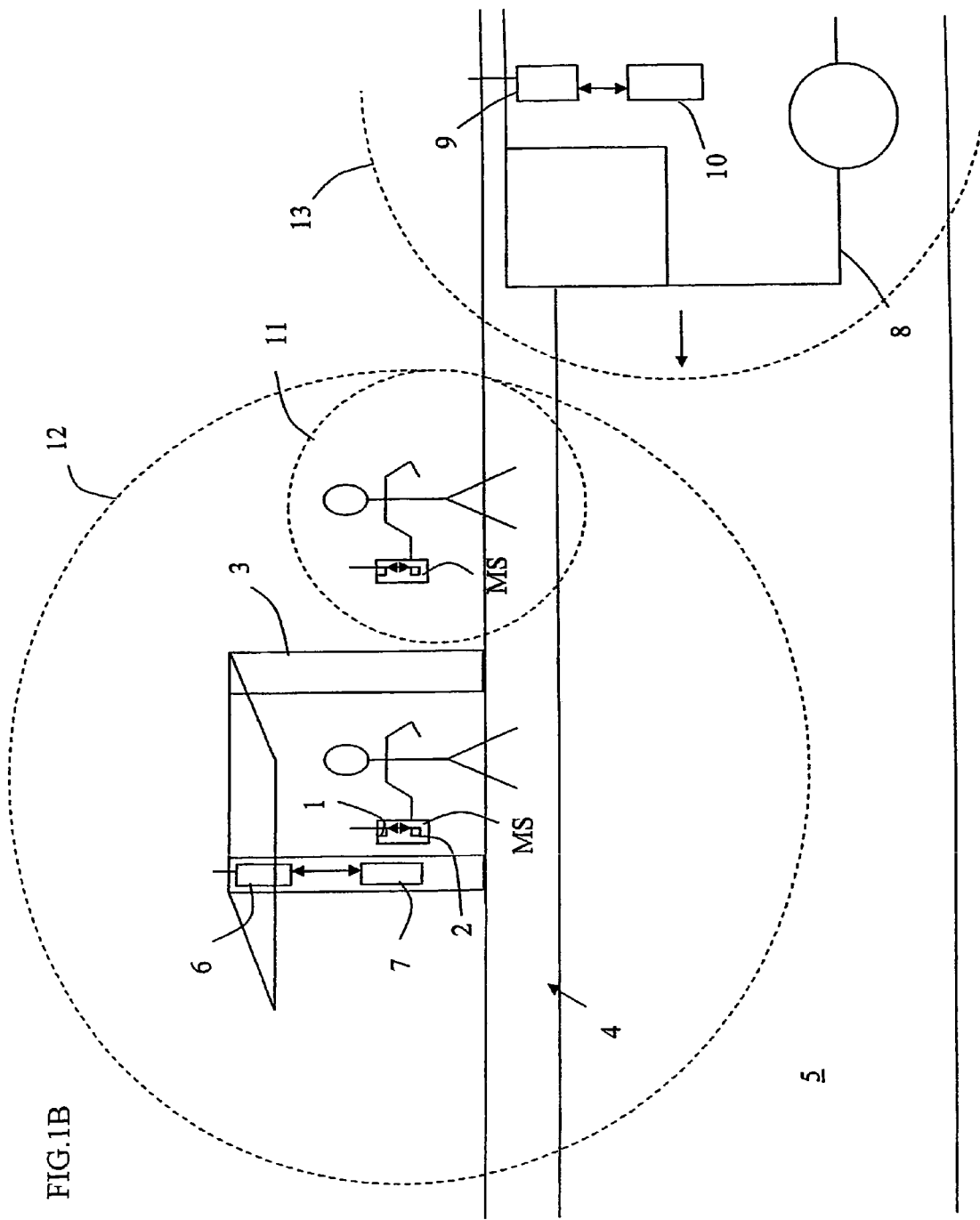

DEVICE AND METHOD FOR MANAGING DATA BETWEEN COMMUNICATION FACILITIES TO OBTAIN A MOBILE SERVICE

The invention relates to the field of communications facilities, and more particularly to the management of data exchanged between mobile user stations and other types of fixed or mobile equipment in order to obtain a service.

Here, the expression "to obtain a service" means to obtain information or data or to initiate or carry out a procedure, such as for example a purchase, a booking, a delivery, or a pick-up by a vehicle.

The advent of mobile communications networks, and particularly GSM/GPRS and UMTS networks, has enabled large numbers of people to obtain services remotely by establishing communication between their mobile station, such as a mobile telephone or a personal digital assistant (or PDA), and remote communications equipment, such as a server, a mobile station or a computer.

There are many situations however in which a person (or user) equipped with a mobile station is unable to obtain the service they want. This is particularly the case in the field of public transport and in the provision of data or information in certain busy public or private places. For example, a person of restricted mobility making his or her way to a bus stop is unable to inform the next bus due to arrive at that stop that they wish to be picked up. This situation is even more frustrating in the case of, a person who is partially sighted or hard of hearing, in that the former is unable to see the bus or read the route number of a bus they have heard arriving, and the latter is unable to hear a bus arrive. Furthermore, in certain public or private places, such as airports, railway stations or shopping centres, it is common to find information desks deserted by the personnel responsible for providing directions or information.

The object of the invention is therefore to improve the situation by proposing a solution enabling some of the aforementioned drawbacks to be overcome.

To this end it proposes a method for managing data between user mobile stations equipped with a communication module, stationary terminals associated with at least one service, and a plurality of mobile service means equipped with a communication module and adapted to ensure said service.

This method is characterised in that it includes:
- a first stage in which, with the aid of a user mobile station, a primary request is generated including data defining a request for obtaining a selected service (such as stopping a bus for example) at a terminal (for example arranged in the form of a bus-shelter or part of a bus-shelter) installed proximate to the mobile station and associated with the service requested,
- a second stage in which, after receiving the primary request, a secondary request is generated including data defining a request for ensuring the selected service at the terminal near the mobile station,
- a third stage in which the secondary request is received at the mobile service means closest to the designated terminal so that it stops at this terminal and provides the service requested by the user of the mobile station which transmitted the primary request.

Of course, when the mobile service means is already stopped at the designated terminal, it can immediately provide the requested service.

In a first embodiment, in the first stage the primary request is received at the terminal and the secondary request is generated at this terminal. In this case, reception of the primary request preferably takes place when the mobile station which generated it is located within the "second" transmission coverage zone of the terminal. For example, generation and reception of the primary request (during the first and second stages) can be accomplished by ad hoc exchanges of messages, within what is referred to by the person skilled in the art as a "spatial information system". The primary request then includes data defining a primary spatial value representing the service selected by the user.

Furthermore, in this first embodiment, the mobile service means (for example a transport vehicle) preferably receives the secondary request (during the third stage) when the designated terminal is located within its third transmission coverage zone. Here again, generation and reception of the secondary request (during the second and third stages) can take place by ad hoc exchanges of messages, also as part of a spatial information system. The secondary request then includes data defining a secondary spatial value representing the service selected by the user.

In a second embodiment, during the second stage the primary request is received at a management server, then the position of the terminal proximate to the user mobile station (which transmitted the primary request) is determined, together with that of the mobile service means closest to this terminal and capable of providing the service defined in the primary request, and finally the secondary request is sent to this mobile service means via the server.

In this case, determining the position of the closest mobile (in the second stage) can involve sending an auxiliary request to all mobile service means asking them to report their respective positions, then, on receipt of the replies from the different mobile service means, identifying from these replies which of the mobile service means is located closest to the terminal and capable of providing the service defined in the primary request. As a variant, the position of the nearest mobile service means (in the second stage) is determined by comparing the respective positions of the different mobile service means capable of providing the service defined in the primary request with the position of the terminal. In both instances, either the primary request includes the position of the user mobile station and the position of the terminal is deduced from that of the mobile station, or the primary request includes an identifier representing at least the position of the terminal and at least the position of the terminal is deduced from the identifier received.

Furthermore it can be envisaged that, after receiving the primary request, information is sent to the mobile station, for example the time required by the nearest mobile service means to reach the terminal, or advertising information, or informational data defining at least one address of an information site accessible via the Internet.

A method such as this finds particularly useful applications particularly in the field of public transport, and more particularly when, on one hand, the mobile service means are public transport vehicles such as buses or coaches, and when, on the other hand, the terminals constitute all or part of bus-stops (or bus-shelters).

The invention also relates to a device for managing data between at least one user mobile station equipped with a communication module, stationary terminals associated with at least one service, and a plurality of mobile service means equipped with a communication module and adapted to ensure the service.

The device is characterised in that it includes, in a first part, first control means intended to be implanted in the mobile station of a user and capable, at the user's instruction, of generating a primary request including data defining a request to obtain a service selected at a terminal installed proximate to the mobile station and associated with the selected service, and in a second part, second control means capable, on receiving a primary request, of generating a secondary request including data defining a request for provision of the service selected at the terminal, and in a third part, third control means implanted in each of the mobile service means and capable, on receiving a secondary request from the associated communication module, to order stoppage of the associated mobile service means at the designated terminal so as to ensure the service requested by the user of the mobile station.

Of course, as previously indicated in reference to the method, when the mobile service means is already stopped at the designated terminal, it is instructed to remain stopped in order to provide the requested service.

In a first embodiment, each terminal is equipped with a communication module and includes second control means.

In this case, preferably the communication modules of the mobile station and the terminal respectively have a first and a second transmission coverage zone, and the communication modules of the terminals are capable of receiving a primary request when the mobile station which generated it is located within their "second" transmission coverage zone.

For example, the communication modules of the mobile station and the terminals can be respectively arranged so as to generate and receive the primary request by ad hoc exchanges of messages containing data delivered by the first and second control modules, as part of a spatial information system. The first control means are then preferably arranged so as to generate primary requests including data defining a primary spatial value representing the service selected by the user.

Furthermore, in this first embodiment, the communication module of each of the mobile service means preferably has a third transmission coverage zone and is capable of accepting a secondary request when the designated terminal is located within their third transmission coverage zone. Again, the communication modules of the terminals and mobile service means are preferably arranged, respectively, so as to transmit and receive a secondary request by ad hoc exchanges of messages containing data delivered by the second and third control modules, as part of a spatial information system. The second control means are then preferably capable of generating secondary requests including secondary data defining a secondary spatial value representing the service selected.

In a second embodiment, the second control means can be implanted in a server equipped with a communication module and are capable, upon receiving a primary request, of identifying on one hand at least the position of the terminal proximate to the user mobile station, and on the other hand the mobile service means closest to this terminal and capable of providing the service defined in the primary request, and of sending the secondary request to this mobile service means via the associated communication module.

In this case, the second control means can be capable, on receiving a primary request from the associated communication module, of sending an auxiliary request to all mobile service means asking them to report their respective positions then, upon reception of their replies, of identifying the mobile service means that is closest to the terminal and capable of providing the service defined in the primary request. As a variant, the second control means can be capable, on receiving a primary request from the associated communication module, of comparing the respective positions of different mobile service means capable of providing the service defined in the primary request, with the position of the terminal, so as to identify the mobile service means closest to this terminal. In both cases, either the second control means can be capable of identifying the position of a mobile station that has transmitted a primary request and thereby determine the position of the terminal, or the first control means can be capable of incorporating an identifier in the primary request representing at least the position of the terminal, and the second control means are arranged so as to determine from the identifier contained in a received primary request at least the position of the associated terminal.

Furthermore, the second control means can be arranged, on receiving a primary request, to enable information to be communicated to the mobile station which transmitted this primary request. Such information can for example be determined by the second control means and can indicate the time required for the nearest mobile service means to reach the terminal. However, it can also consist of advertising information or informational data defining at least one address of an information site accessible via the Internet.

The invention also relates, in a first part, to a mobile station, such as a mobile telephone or a personal digital assistant (or PDA), equipped with a communication module and first control means in an arrangement of the type described above; in a second part, a terminal intended for example to be installed in a public place such as a bus or coach stop; airport or railway station, and equipped with a communication module and second control means in an arrangement of the type described above; and in a third part, a public transport vehicle, such as a bus or coach, equipped with a communication module and third control means in an arrangement of the type described above.

Figure 1C:
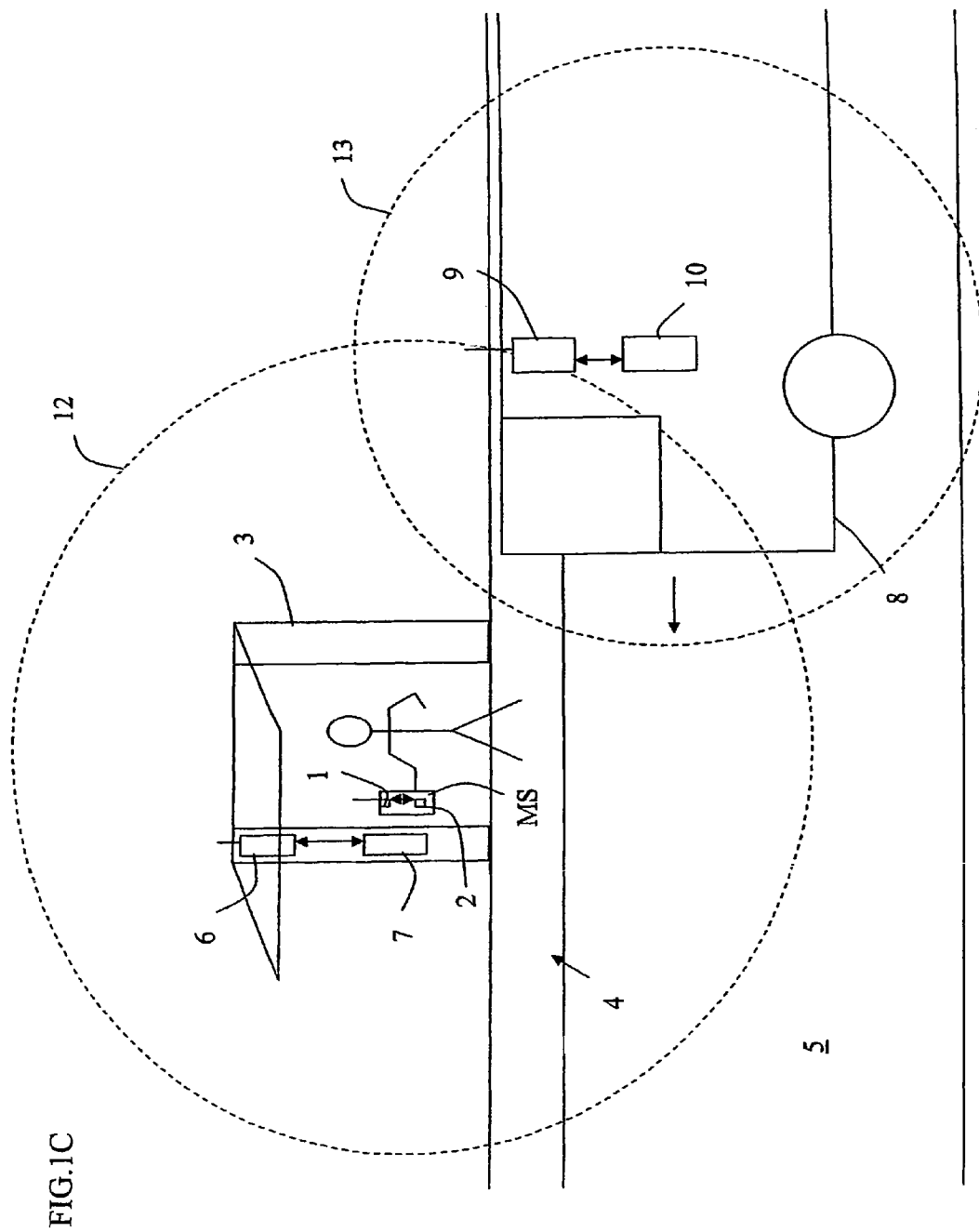
Figure 1D:
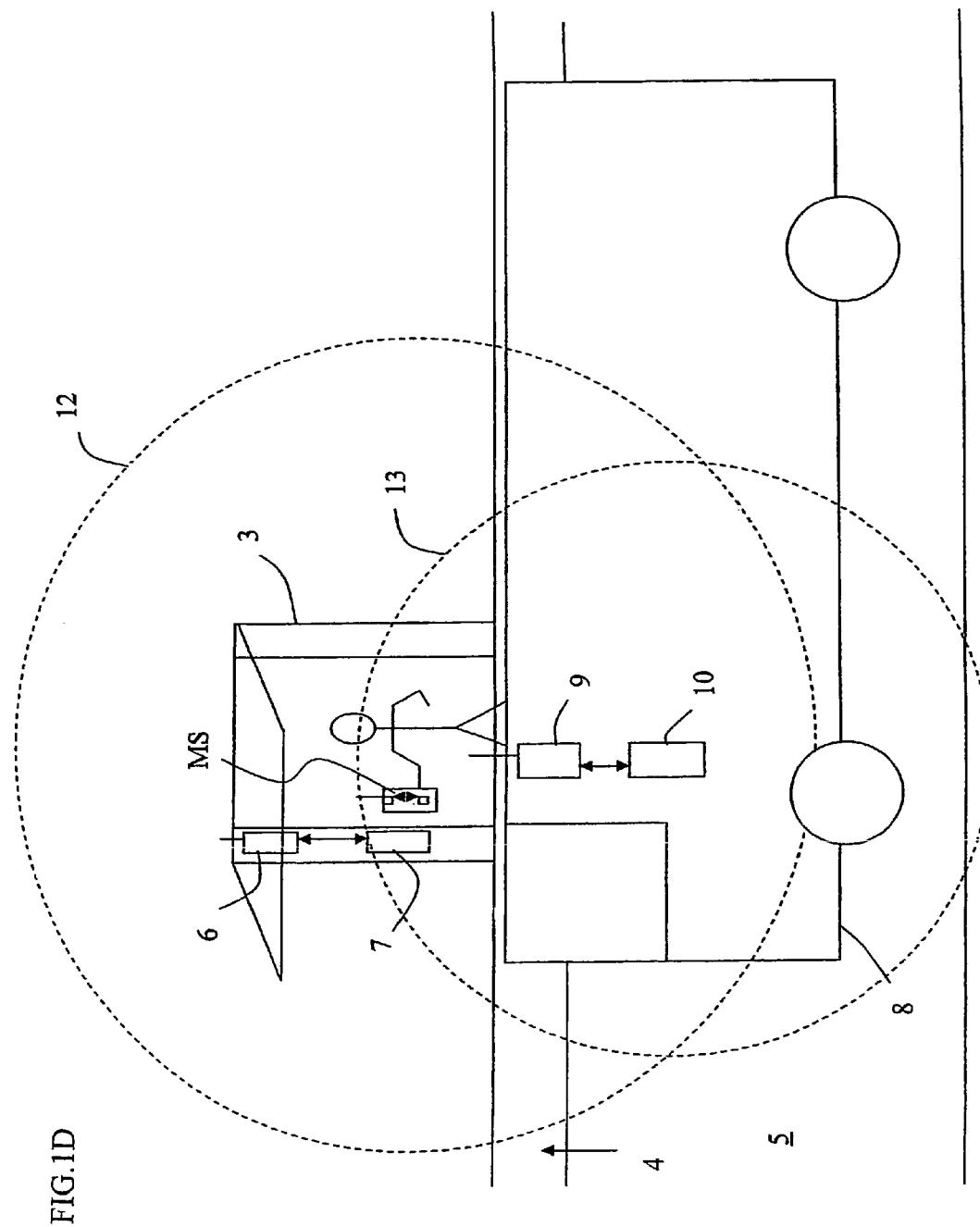
Figure 2A:
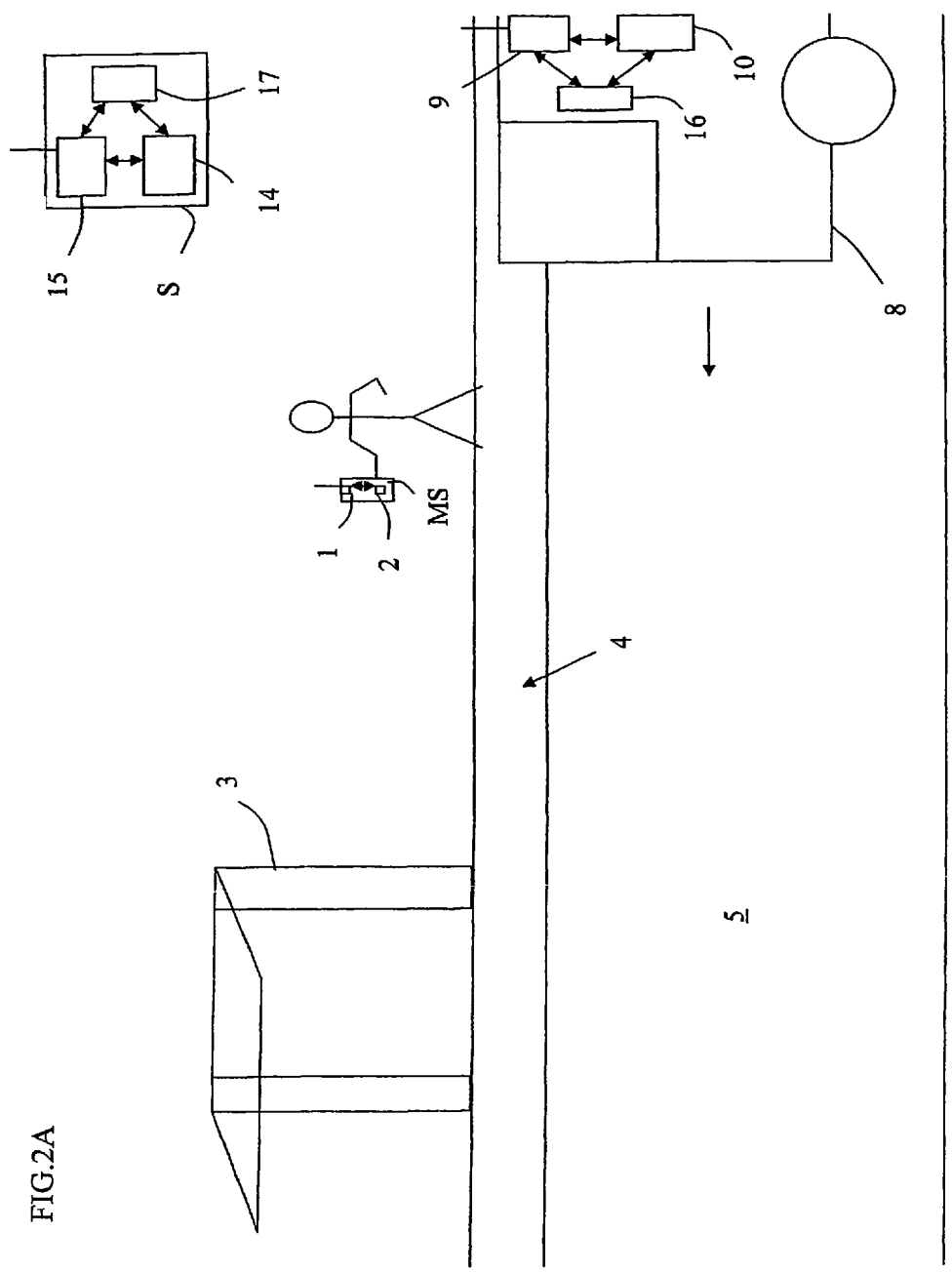
Figure 2B:
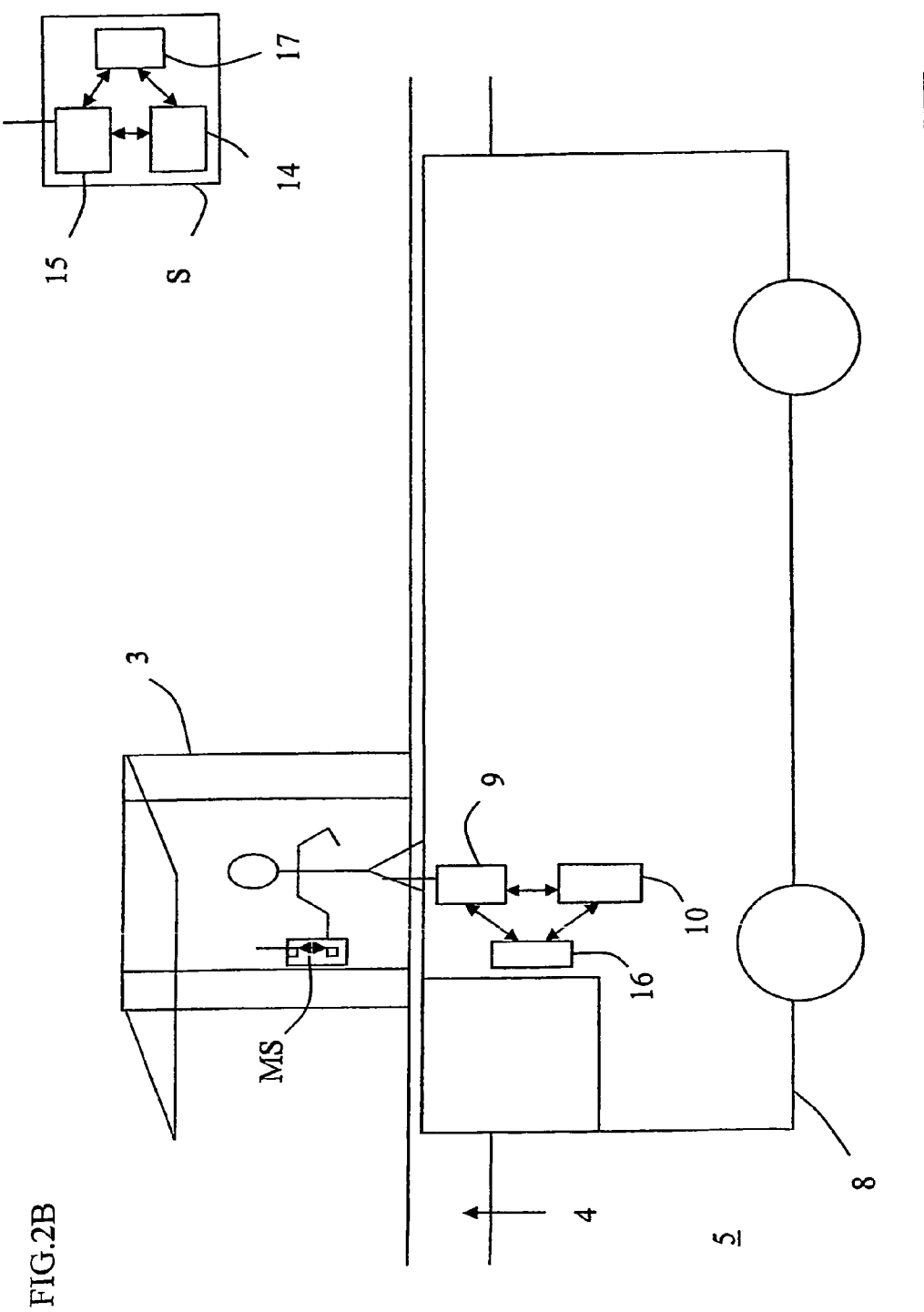

Other characteristics and advantages of the invention will become apparent upon examination of the following detailed description together with the attached drawings in which:

FIGS. 1A to 1D diagrammatically illustrate four phases of a first embodiment of the invention, in an application for the management of bus routes, and FIGS. 2A and 2B diagrammatically illustrate two phases of a second embodiment of the invention, also in an application for the management of bus routes.

The attached drawings may not only serve to complete the invention, but may also contribute to its definition, as the case may be.

As indicated in the introduction, the invention relates to the management of data between one or more mobile communication stations belonging to users, stationary terminals associated with one or more services, and a plurality of mobile service means equipped with a communication module and capable of providing at least one of the services.

To this end, it proposes a management device of the type depicted in FIGS. 1A to 1D, by way of a first embodiment. This embodiment relates to the management of bus (or coach) stops at the stopping places (or "bus-shelters") on the routes travelled by the vehicles.

Of course, the invention is not limited to this type of application. It relates in a general manner to the ordering of a service that can be provided by mobile service means at a stationary terminal associated with said service, using a mobile communication station installed proximate to this stationary terminal. It therefore relates to the field of public transport in which the vehicles (buses or coaches) comprising the mobile service means stop at fixed terminals (or bus-shelters) arranged along known lines (or routes). It also relates to the area of provision of information or data to persons equipped with a mobile station, at fixed terminals (or information points), by personnel equipped with a communication device.

In the example illustrated in FIGS. 1A to 1D, the users are equipped with a mobile station MS including a communication module 1 coupled to a first control module 2 intended to generate primary requests for obtaining a service at a bus-shelter on a bus route. The mobile station MS can therefore be a mobile telephone or a personal digital assistant (or PDA). However, in a general manner, it can be any type of mobile equipment equipped with a communication module, such as a portable computer for example.

These primary requests are transmitted, in a manner that will be described below, to stationary terminals 3 located in the vicinity of the mobile station MS, via their communication modules 1.

In this example, the stationary terminals 3 are bus-shelters placed at selected locations on a bus route, for example on pavements 4 bordering the carriageway 5, and each includes a communication module 6 coupled to a second control module 7. This second control module 7 is arranged to analyse each primary request received by the communication module 6 to which it is coupled, and to generate in response a secondary request including data defining a request for provision, at the bus-shelter in which it is installed, of the service defined in the primary request received.

These secondary requests are intended to be transmitted to buses 8 travelling on the carriageways 5 along which are placed the bus-shelters 3 on the routes served.

They are transmitted, in a manner that will be described below, by the communication modules 6 in the bus-shelters 3.

Furthermore, in this example the buses 8 constitute mobile service means. They are equipped with a communication module 9 coupled to a third control module 10. This third control module 10 is arranged to analyse each secondary request received by the communication module 9 to which it is coupled, and to generate in response a message intended to alert the driver of the bus in which it is installed to stop at the next bus-shelter, as will be seen below.

This first embodiment of the invention is more particularly intended for so-called "IT ubiquity" environments, or in other words "spatial information systems". Such systems or environments are particularly described in the papers listed below:

"Some computer science issues in ubiquitous computing, M. Wieser, Communication of the ACM, 36(7), p. 75-83, July 1993;

"Context-aware computing applications", B. N. Schilit, N. Adams and R. Want, Proceedings of the second international workshop on mobile computing systems and applications, Santa Cruz, Calif., December 1994;

"LIME: Linda meets mobility", G. P. Picco, A. L. Murphy and G-C. Roman, International conference on software engineering, p. 368-377, 1999;

"SIS: A new paradigm for mobile computing systems", M. Banatre and F. Weis, Proceedings of the information society technologies conference (IST 99), 1999;

"Contextual mobility in information systems", P. Couderc, Doctoral Thesis, University of Rennes-1, 2001;

"SIDE surfer: a spontaneous information discovery and exchange system", D. Touzet, J-M. Menaud, M. Banâtre, P. Couderc and F. Weis, Proceedings of the second international workshop on ubiquitous computing and communications (WUCC 01), September 2001.

The purpose of such systems or environments is to provide transparent integration of digital environments into the physical world, without the users being aware that they are using the services of computers to create the environment with which they are interacting. To this end, the tasks of acquiring the operating environment, also termed "context", are delegated to specialised systems, such as GPS type location systems for example.

Given the mobile nature of a user, digital ubiquity is reliant on wireless communications, generally of short range, typically several meters, and typically averaging around a hundred meters. Therefore, in this first embodiment, the communication modules 1, 6 and 9 of the mobile stations MS, stationary terminals 3 and buses 8 are preferably of short or medium range. They can therefore be made to operate in radio frequency mode, such as particularly Bluetooth or IEEE 802.11 (or WiFi), or infra-red.

Preferably, the ranges of the communication modules 1, 6 and 9 of the mobile stations MS, stationary terminals 3 and buses 8, in terms of both transmission and reception, are different. In other words, each communication module has a transmission coverage zone adapted to its mode of power supply. For example, as depicted in FIGS. 1A to 1D, communication module 1 of the mobile station MS has a first coverage zone 11 substantially in the form of a sphere with a radius of several meters, communication module 6 at the bus-shelter 3 has a second coverage zone 12 substantially in the form of a sphere with a radius ranging from several tens to a hundred meters, and communication module 9 on the bus 8 has a third coverage zone 13 substantially in the form of a sphere with a radius ranging from several tens to a hundred meters. In FIGS. 1A to 1D, the envelopes 11 to 13 delineating the different coverage zones for illustrative purposes are not to scale.

In the foregoing application, a person equipped with a mobile station MS fitted with a communication module 1 and a first control module 2, approaches a bus-shelter 3 on a bus route in order to board the next bus 8 serving this route in the direction A to B. For example, the bus-shelter corresponds to stop No. 4 on route No. 6, in the direction A to B.

In order to alert the next bus 8 (via the bus-shelter 3), the person can select an operation from the menu of his/her mobile station MS, or activate a dedicated key on the mobile station associated with a function handled by the first control module 2 and dedicated to the generation of a primary request to ask the next bus 8 to stop at the nearest bus-shelter 3. It can also be envisaged that the operation selection is effected by means of voice command(s), which is particularly suitable particularly for the partially-sighted.

Of course, selection of the function may require the user to specify the direction in which he/she wishes to travel, particularly so as to allow for situations in which the person is not on the pavement corresponding to the desired direction.

When the first control module 2 is alerted that the above function has been selected by the user of the mobile station MS in which it is implanted, it generates a primary request which it transmits to the communication module 1 to which it is coupled. In effect, it creates a first spatial value, for example <stop>, or <stop route 6 A to B> where the route and the desired direction have been indicated. The communication module 1 then generates a message containing this first spatial value which is intended for the bus-shelter 3 towards which the person is moving.

As long as the mobile station MS is not inside the second coverage zone 12 of the bus-shelter, as depicted in FIG. 1A, no exchange can take place between their respective communication modules 1 and 6. However, when the mobile station MS is fully inside the second coverage zone 12 as depicted in FIG. 1B, their communication modules can exchange messages telling the second control module 7 that a person wishes to stop the next bus on route No. 6 (in the direction A to B as the case may be).

The function to generate the primary request can if necessary be configured to add to the first spatial value the type of disability of the person making the request (for example "partially sighted" or "person in wheelchair"). In this case, the exchange of messages between the communication modules can also enable the person's disability to be notified to the second control module 7.

Of course, when the second control module 7 is not configured for route No. 6 and/or for the direction A to B, it sends a message to the first control module 2 of the mobile station MS, via their respective communication modules 1 and 6, to indicate that it is not concerned by the stop request.

Once in possession of the first spatial value, the second control module 7 at the bus-shelter 3 generates a secondary request intended to tell the next bus 8 travelling on route No. 6 in the direction A to B that it must stop to pick up a passenger. This secondary request can also indicate the type of disability of the person to be picked up. In effect, the second control module 7 creates a second spatial value, for example <Bus route 6>, or <Bus route 6 A to B>, or <Bus route 6 partially sighted> when the disability of the person has been indicated. This second spatial value is then transmitted to communication module 6 which generates a message containing it.

As long as the designated bus-shelter 3 is not inside the third transmission coverage zone 13 of a bus 8, as depicted in FIG. 1B, no exchange can take place between their respective communication modules 9 and 6. However, when the bus-shelter 3 is inside the third transmission coverage zone of the bus 8, as depicted in FIG. 1C, their communication modules can exchange messages to tell the third control module 10 that a person, whose type of disability is indicated if need be, requires the bus 8, in which it is installed, to stop at the next bus-shelter 3 on route No. 6. The third control module 10 then sends a message to the on-board computer of the bus 8 indicating that it must stop at the next bus-shelter 3 on route No. 6 to pick up a passenger (disabled as the case may be). The notification can be accomplished by any known means, such as for example by displaying the message on a screen, or by illuminating a dedicated visual indicator. Preferably, the message also has the effect of activating the stop request function accessible to passengers on the bus 8.

Of course, when the third control module 10 is not configured for route No. 6 and/or for the direction A to B, it sends a message to the second control module 7 at the bus-shelter 3, via their respective communication modules 9 and 6, to tell it that it is not concerned by the stop request.

On arriving at the bus-shelter, the driver of the bus 8, alerted by the "secondary request", stops his bus 8, as depicted in FIG. 1D. If the person is disabled, and a special entrance or means of access is provided, the driver can place his bus so that the entrance or means of access is positioned facing the person requesting the stop.

In this first embodiment, the user's mobile communication station MS can be made in the form of a unit dedicated specifically to the application. Therefore, even though it may be practical to integrate the communication module 1 and the first control module 2 into a mobile telephone or a PDA (for example), this is in no way obligatory. A mobile station MS such as a mobile telephone, PDA or portable computer may be indispensable, however, when the second control module 7 installed at a stationary terminal 3 (in this instance a bus-shelter) is configured to deliver information to said mobile station.

The second control module 7 can in fact be arranged so as to determine the time required for the next bus 8 capable of providing the required service to arrive at the bus-shelter 3. This can be accomplished for example in collaboration with a central server which knows the positions of all the buses on the same route with relative accuracy, together with any traffic information. Of course, this means that, on one hand, all bus-shelters 3 have to be equipped with a radio communication module coupled to the second control module 7 and, on the other hand, that all buses 8 have to be equipped with a position-finding device, such as a GPS beacon for example, possibly coupled to a radio communication module.

The second control module 7 can be also arranged to deliver to the mobile stations MS, via their respective communication modules 6 and 1, advertising information and/or data representing the addresses of Internet sites from which information can be obtained. For example, the advertising information can complement advertisements displayed on the walls of the bus-shelter. Similarly, the address data can give the user the opportunity to access the information site of the transport company operating the bus route or the sites of companies whose products and/or brands and/or names are displayed on the walls of the bus-shelter 3.

The second control module 7 can be also arranged to deliver to the mobile stations MS, via their respective communication modules 6 and 1, local information such as for example district maps, municipal information of a practical or cultural nature, and the like.

All of this information can be updated on an ad hoc and local basis and/or automated by a remote information server. Ad hoc and local updating applies more specifically to information relating to the advertisements carried by the bus-shelter. It may be carried out by the people who come to replace the advertisements, for example using a terminal fitted with a communications interface of the Bluetooth or WiFi type and capable of communicating with the control module 7 implanted in the terminal (or bus-shelter).

To provide the function of communicating local information, the second control module 7 can, for example, implement the methods described in patent documents FR 2 783 996 and FR 2 809 263, the content of which is incorporated herein by reference.

However, remote communication of information requires the second control module 7 to be coupled to a telephone communication module connected to a telephony network, preferably of the cellular type (for example GSM/GPRS or UMTS).

To be able to access Internet sites in real time, the mobile stations MS must be mobile units equipped with a navigation module, as is particularly the case with GSM/GPRS or UMTS telephones. However, sites whose addresses have been furnished by the second control module 7 can be accessed offline. To do this, the user needs to save the addresses in the memory of the mobile station MS. This "offline" solution, in which addresses are stored for later access, is more particularly applicable to PDAs.

In the foregoing, the communication modules 1, 6 and 9, and the first, second and third control modules 2, 7, and 10 respectively installed in the mobile stations MS, stationary terminals 3 and buses 8 (or mobile service means) constitute a first example of a management device according to the invention.

The control modules 2, 7 and 10 of the mobile stations MS, stationary terminals (or bus-shelters) 3 and buses 8 can be implanted: in non-dedicated communications terminals, such as PDAs or mobile telephones for example, but also in dedicated communication units. In the particular case of partially-sighted persons, it is not in fact useful to provide visual means of information display, whereas it is possible to use dedicated units such as "simplified" PDAs with no screen but preferably equipped with means of voice synthesis. Similarly, the dedicated terminal or unit on board a bus or installed in a bus-shelter (or terminal) does not need to include display means.

In the more particular case of buses, in which the driver needs to be alerted to stop requests, an illuminated indicator can suffice; display means are only useful in practice when it is desired to alert the driver with the aid of messages (which can be used to indicate the type of disability of the person requesting the stop).

Furthermore, these communication terminals or units can be equipped for example with communication modules of the type Bluetooth or WiFi (or IEEE 802.11). Given that Bluetooth type communication modules are of limited range, they have a low power consumption. They are therefore well suited to user terminals (or dedicated units) (or mobile stations MS).

However, WiFi type communication modules that have a relatively long range are suitable for dedicated terminals or units mounted on board buses or installed in the bus-shelter (or terminals). Clearly, assuming that the mobile stations and the buses are not equipped with the same types of communication means, the bus-shelter (or terminal) must be equipped with two types of communication means so as to be able to conduct a dialogue with the mobile stations and the buses.

Furthermore, any type of IT ubiquity environment or any type of spatial information system known to the person skilled in the art can be envisaged to enable the invention to be implemented for the purposes of this first example. However, the method described below can be used to good effect, also referred to as SPREAD (for "Spatial Programming Environment for Ambient Computing Design").

In the SPREAD method, it is considered that a spatial information system is composed of a set of physical entities (or "electronic" representatives mounted on the entities) each of which occupies a physical space of limited volume (or transmission coverage zone). The expression "physical entity" is understood to mean, for example in reference to the aforementioned application, a fixed terminal or a mobile station or a bus. Each of these entities is associated with a set of information, so that each point in the physical space is included in a set, possibly empty, of volumes associated with different entities.

The physical space (volume) thus constitutes the global memory of the spatial information system architecture, which stores the accessible information.

At a given instant, a process implanted in a mobile computer is therefore associated with a point in the physical space. The information set, also termed context, that is accessible to this process is therefore characterised by the set of entities for which the point in space with which it is associated belongs to the set of associated volumes. The context therefore varies at each instant in relation to the mobility of the processes (and therefore the entities) and/or reorganisation of the global memory by virtue of an explicit movement of the information "containers".

As previously indicated, the (physical) scope of the information held by each entity depends on the coverage zone of its communication module.

As several entities can take part in a process, a mechanism for selecting the information associated with the different entities according to their respective types is used. Preferably, this is accomplished by means of "tuples" and "tuple spaces" introduced by the Linda model.

By definition, any information associated with an entity is characterised by a "tuple" composed of a standard sequence of information. For example, the spatial value <"Bus", 6, (17,30)> defines a tuple of which the first element is a string corresponding to the bus company, the second element is an integer corresponding to the bus route number, and the third element is an integer doublet corresponding to the estimated arrival time of the bus at the next bus-shelter.

Thanks to the sets of tuples, the processes are implicitly synchronised on the current state of the data. In other words, the sets of tuples reflect the logical state of the physical environment which facilitates spatial programming in which the structure and flow control of the information system are directly dependent on the physical entities and on the spatial relationships between these physical entities.

As the information is "stored" in subsets of the physical space, which constitutes a kind of memory, it is then necessary to manage the addressing of this information by a computing process that is located at a point in the physical space. This point in effect determines the subset of information that can be used by the computing process during an action such as an arithmetic calculation. Therefore, to access (or read) another subset of information the process must move to another point corresponding thereto, or entities involved in the process must move so that their information can fill the portion of the space accessible to said process.

Information addressing can be accomplished anonymously using what the person skilled in the art refers to as "pattern matching" between a tuple model and elements of the tuple space. In other words, the model (or pattern) to which a tuple or a set of tuples present in a tuple space corresponds is specified. A model (or pattern) is made up of a template in which each element is either a type (which means that the element corresponds to all of the values taken by the specified type), or a value (which means that the element corresponds to the specified value).

To access the information (or tuples) contained in the tuple spaces, it is possible for example to use the operations (or primitives) defined below, which take into account, on one hand, the physical mobility of the entities and processes and, on the other hand, the fact that the entities are physical objects.

A first operation termed "out(tuple)" for example is used to insert (or publish) a new tuple in the tuple space of a given entity. The extent of this tuple depends of course on the physical volume (or coverage zone) occupied by the entity invoking it. In other words, the tuple fills the physical space (or coverage zone) surrounding the entity which invoked it.

A second operation termed "rd(pattern)" for example is used to non-destructively retrieve a tuple matching the pattern (or model) entered in the form of parameters. The extent of this retrieved tuple depends of course on the physical volume (or coverage zone) occupied by the entity invoking it. It is important to note that the tuple is not removed from the tuple space; it is simply "read". Furthermore, when several tuples match a model (or pattern), each of these tuples can be retrieved. However, when no tuple matches the model (or pattern), the process is blocked.

A third operation termed "capture(pattern)" for example can be used to retrieve a set of tuples that match a specified model (or pattern). The extent of this retrieved set of tuples depends of course on the physical volume (or coverage zone) occupied by the entity invoking it. This operation is a "multiple" version of the "rd(pattern)" operation. Therefore, when no tuple matches the model (or pattern), the process is blocked.

A fourth operation termed "drop(tuple)" for example allows the entity which previously inserted (or published) a tuple to remove it from the corresponding tuple space.

The operations rd(pattern) and capture (pattern) are preferably performed on all the tuple spaces in the context of the process executing them.

An example of the use of the abovementioned operations, intended to enable a user to be picked up at a bus-shelter, is described below.

In a first stage, the user makes a stop request using the mobile station MS. The control module 2 of the mobile station MS initiates a first action A1 which involves performing the operation out<"p-stop",i> for example, with a view to triggering on one hand, a synchronous action which takes place at the level of a fifth action A5, and on the other hand an asynchronous action which terminates at the level of a sixth action A6, as will be seen below.

In a second stage, a bus-shelter 3 accepts the user's request. This requires a dual condition (or situation) to be satisfied: the bus-shelter 3 must be included in the transmission coverage zone 11 of the user's mobile station MS and the control module 2 of the mobile station MS must have published the tuple <"p-stop",i>. If this is the case, the control module 7 at the bus-shelter 3 initiates an action A2 which involves performing for example the following three operations rd(<"p-stop",i>), then drop(<"ok-depart",i>), and finally out(<"bus-shelter-stop",i>). This triggers a synchronous action which takes place at the level of an eighth action A8.

Each tuple <"p-stop",i>gives rise to an operation out (<"bus-shelter-stop",i>) by the bus-shelter 3 when the spatial configuration of die entities (mobile station MS and bus-shelter 3) matches the dual condition (or situation) described.

In a third stage, a bus 8i approaches the bus-shelter 3 and accepts the request from this bus-shelter 3. This requires a dual condition (or situation) to be satisfied: the bus 8i must be included in the transmission coverage zone 12 of the bus-shelter 3 and the control module 7 of the bus-shelter 3 must have published the tuple <"bus-shelter-stop",i>. If this is the case, the control module 10 of bus 8i initiates a synchronous action A3 which involves performing for example the following three actions rd(<"bus-shelter-stop",i>), which represents the notification of a message to the driver requesting him to mark the next stop, then rd(<"ok-depart",i>), and finally drop (<"depart",i>). This action A3 loops infinitely on itself.

Then, when the bus 8i stops, the order to open the door is synchronised with the operation out(<"board",i>) performed by the control module 10 of the bus 8i in a synchronous action A4 which loops infinitely on itself.

Then, the control module 2 of the user's mobile station MS initiates a synchronous action A5 which involves performing for example the operations rd(<"board",i>) and drop(<"p-stop",i>). This action A5 is then followed up by a new action A1.

Finally, the control module 2 of the user's mobile station MS initiates an asynchronous action A6 which involves performing the operation rd(<"board",i>) which triggers, for example, either the display of a message on the screen of the mobile station MS, or the transmission of an audible message indicating that the bus 8i can be boarded because its door is now open. This terminates the asynchronous action A1.

In a fourth stage, the bus 8i leaves the bus-shelter 3. This requires a dual condition (or situation) to be satisfied: the bus-shelter 3 must be included in the transmission coverage zone 13 of the bus 8i and the control module 10 of the bus 8i must have published the tuple <"depart",i>. If this is the case, the control module 10 of the bus 8i initiates a synchronous action A7 which involves performing for example the following two operations out(<"depart",i>) and drop(<"board",i>). This action A7 loops infinitely on itself.

Then, the control module 7 at the bus-shelter 3 initiates an action A8 which involves performing for example the operations rd(<"depart",i>), then, for each tuple T=<"bus-shelter-stop",i> published during the action A2, drop(T), and finally out(<"ok-depart",i>). This action A8 is then followed up by a new action A2.

In the example described above in reference to FIGS. 1A to 1D, the addressing mechanisms invoking the various operations are implanted in control modules 2, 7 and 10 of the mobile stations MS, stationary terminals (or bus-shelters) 3 and buses 8.

Reference is now made to FIGS. 2A and 2B in describing a second embodiment of the invention, again in the context of a non-limitative application to the management of bus (or coach) pick-ups in dedicated stop zones (or "bus-shelters") on the routes travelled. In this second embodiment, elements that are functionally equivalent or identical to those described in the first embodiment, illustrated in FIGS. 1A to 1D, are identified by the same references.

These two embodiments differ principally in terms of the mode of data exchange between the different participants. In this instance, the stationary terminals 3 do not play an active role. They may even be described as passive. Analysis of primary requests generated by the first control module 2 of a mobile station MS and delivered by its communication module 1, is performed in this case by a single second control means 14 coupled to a communication module 15, both installed in a central server S controlled by the transport company running the bus routes.

In this example, where it is no longer a question of exchanging messages by "proximate interactions", the data exchanges must be accomplished by means of radio waves over a communications network. Therefore the first, second and third communication modules, respectively 1, 15 and 9, implanted in the mobile stations MS, the server S and the buses 8, are all of the radio type. This implementation is therefore particularly well suited to mobile stations MS of the mobile equipment type equipped with a radio communication module, such as mobile telephones for example.

A person equipped with a mobile station MS fitted with a communication module 1 and a first control module 2, approaching a bus-shelter 3 (for example. No. 4) on a bus route (for example No. 6) and wishing to alert the next bus 8 serving this route in the direction A to B, of his/her intention to be picked up at this bus-shelter 3, must select an operation from the menu of his/her mobile station MS, or activate a dedicated key on this mobile station associated with a function handled by the first control module 2 and dedicated to the generation of a primary request asking the next bus 8 to stop at the nearest bus-shelter 3.

When the first control module 1 is alerted that the above function has been selected by the user of the mobile station MS in which it is implanted, it generates a primary request which it transmits to the radio communication module 1. The communication module 1 then generates a radio message representing this primary request, for transmission to the server S.

In this embodiment, the server needs to know the geographical position of the bus-shelter 3 towards which the person issuing the primary request is moving as well as the bus route number (and possibly the direction) that the requesting person wishes to take. Two solutions can be envisaged to achieve this.

The first solution involves providing the bus-shelter 3 with an identifier marked on one of its walls, or on a dedicated support, indicating the route number served and its number on this route, and possibly also its assigned direction. In this case, when the person selects the stop request function, they must also provide the first control module 2 of their mobile station MS with the identifier of the bus-shelter at which they wish to be picked up. This can be done by entering the number via the keypad of the mobile station MS, or orally using a voice command as the case may be. The identifier of the bus-shelter 3 is then included in the primary request which is then transmitted to the server S via the communication module 1.

Once the second control module 14 of the server S is in possession of the content of the primary request, it extracts the identifier and determines the geographical position of the bus-shelter 3 and the route and direction served by it, using an "identifier/position/route/direction" lookup table.

The second solution involves equipping each mobile station MS with a position-finding device, such as a GPS module for example, coupled to the radio communication module 1. In this case, when the person selects the stop request function, the first control module 2 of their mobile station MS interrogates the position-finder module to obtain its position for inclusion in the primary request which is then transmitted to the server S via the communication module 1. It is important to note that when the bus-shelter serves several routes, the user must in this case provide the first control module 2 with the route number (and possibly also the direction) that he/she wishes to take. This can be done by entering the number via the keypad of the mobile station MS, or orally using a voice command as the case may be.

Once the second control module 14 of the server S is in possession of the content of the primary request, it extracts the route number (and the direction if any) and the position of the requesting mobile station, then refers to a table of bus-shelter positions to look up the geographical position of the bus-shelter 3 nearest to that of the mobile station MS, taking account of the direction information (A to B) if any.

In both solutions, when the second control module 14 of the server S is in possession of the position of the designated bus-shelter 3, it determines which bus 8 on the designated route, in this case No. 6, is closest to this bus-shelter. For this purpose, all of the buses 8 must be equipped with a position-finding device 16, such as a GPS module for example, coupled, to the radio communication module 1.

Two cases can be envisaged according to whether or not the positions of each bus are periodically transmitted by the bus 8 to a position management module 17 implanted in the server S, for example through the medium of SMS type messages (in the case of a GSM type network).

When this is the case, as illustrated in FIGS. 2A and 2B, the third control module 14 therefore only needs to interrogate the management module 17 to know the positions of the buses on route No. 6 travelling in the direction A to B (and which are therefore capable of providing the service required by the user). It then compares these positions with the position of the designated bus-shelter 3 in order to identify which bus 8 is closest to it.

However, when the buses 8 notify their positions on request, the third control module 14 must send a report position request to each bus on the designated route. This can be accomplished for example by means of SMS type messages. Upon receipt of the positions of all buses 8 on the designated route travelling in the direction A to B, the third control module 14 therefore only has to compare these with the position of the designated bus-shelter 3 in order to identify the bus that is closest to it.

Once the control module 14 has identified the bus 8 closest to the designated bus-shelter 3, it generates a secondary request intended to tell this bus 8 that it must stop to pick up a passenger. This secondary request can also indicate the type of disability of the person to be picked up. It is transmitted to the communication module 15 which generates a message, for example of the SMS type, for transmittal to the target bus 8.

For example, the third control module 10 is implanted in a dedicated unit installed on the dashboard of the bus 8 and equipped with a signalling device, such as a warning lamp. Thus, on receiving the message, the third control module 10 causes the warning lamp to illuminate so as to indicate to the bus driver that he must stop at the next bus-shelter 3 on route No. 6 to pick up a passenger (disabled as the case may be).

In a variant, on receiving the message, the third control module 10 sends a message to the on-board computer of the bus 8 to tell it to stop at the next bus-shelter 3 on route No. 6 to pick up a passenger (disabled as the case may be). The notification can be accomplished by any known means, such as for example by displaying the message on a screen, or by illuminating a dedicated visual indicator. Preferably, the message also has the effect of activating the stop request function accessible to passengers on the bus 8.

On arriving at the bus-shelter, the driver of the bus 8, alerted by the "secondary request", stops his bus 8, as depicted in FIG. 2B. If the person is disabled, and a special entrance or means of access is provided, the driver can place his bus so that the entrance or means of access is positioned facing the person requesting the stop.

In the description of the foregoing second example, the server S, the communication modules 1, 15 and 9, the first, second and third control modules 2, 14 and 10 respectively implanted in the mobile stations MS, the server S and the buses 8 (or mobile service means), and the position-finding devices 16 implanted in the buses 8, together with the management device 17, if any, implanted in the server S, constitute a second example of a management device according to the invention.

Furthermore, reference is made in the foregoing description to control modules 2, 10 and 14, and to a position management module 17. These modules can be implemented in the form of electronic circuits (hardware), logic or data processing modules (software), or a combination of circuitry and software.

The invention also relates to a method for managing data between user mobile stations equipped with a communication module, stationary terminals associated with at least one service, and a plurality of mobile service means equipped with a communication module and adapted to ensure said service.

This can be implemented by means of the management device described above in reference to FIGS. 1 and 2. Given that the principal and optional functions and subfunctions provided by the stages of this method are substantially identical to those provided by the various means constituting the management device, only those embodying the principal functions of the method according to the invention will be summarised below.

This method is characterised by the following steps:
- a first stage (a) in which, with the aid of a user mobile station, a primary request is generated including data defining a request for obtaining a service (such as stopping a bus for example) selected at a terminal (for example arranged in the form of a bus-shelter or part of a bus-shelter) installed proximate to the mobile station and associated with the service requested,
- a second stage (b) in which, after receiving the primary request, a secondary request is generated including data defining a request for ensuring the selected service at the terminal near the mobile station,
- a third stage (c) in which the secondary request is received at the mobile service means closest to the designated terminal so that it stops at this terminal and provides the service requested by the user of the mobile station which transmitted the primary request.

This method can particularly be implemented both within an IT ubiquity environment (or spatial information system) in which the exchange of messages is accomplished by proximate interactions, without determining the position of the various entities involved, and also through a more conventional medium reliant on data exchange via radio waves over a communications network, with determination of the positions of at least some of the various entities involved.

The invention is not limited to the embodiments of the methods and devices described above by way of example only, but encompasses all variants that can be envisaged by the person skilled in the art pursuant to the claims herebelow.

Thus, an application of the invention to the field of public transport has been described. However, the invention is not limited to this application. It also relates to the area of provision of information or data to requesting persons equipped with a mobile station, at fixed terminals (or information points) installed in public or private places such as airports, railway stations or shopping centres. In this case, persons equipped with a communication device incorporating a communication module coupled to a third control module, constitute the mobile service means, and when these persons receive a secondary request they are notified that they must go to the designated terminal for provision of the required service.

The invention claimed is:

1. A method for exchanging data between a portable user equipment (MS), a plurality of service stations placed at selected locations and a plurality of mobile service providers (8), said method including the steps of:
   a) generating a first request message including designating service data and related to a stop request at the portable user equipment (MS);
   b) transmitting the first request message to at least one of the plurality of service stations, wherein the plurality of service stations are placed at selected locations along a route traversed by the mobile service providers and indicate where the mobile service providers can stop, and each of the plurality of service stations being arranged with a short-range communication module which provides a first transmission zone, the portable user equipment including a compatible short-range communication module;
   c) generating a second request message including at least said designating service data and related to the stop request at that one of the plurality of service stations whose first transmission zone contains the portable user equipment upon receiving the first request message;
   d) transmitting the second request message, each of the plurality of mobile service providers being arranged with a short-range communication module which provides a second transmission zone, each of the plurality of service stations including a compatible short-range communication module;
   e) receiving the second request message related to the stop request at that one of the plurality of mobile service providers whose second transmission zone contains one of the plurality of service stations at which the second request message was generated; and
   f) depending on said second request received at said one mobile service provider, stopping such mobile service provider at such service station contained in the second transmission zone of such mobile service provider.

2. The method according to claim 1, each of said plurality of service stations being associated with at least one designated service, wherein step b) is performed only when said designating service data of the first request message matches said at least one designated service.

3. The method according to claim 2, each of said plurality of mobile service providers being associated with at least one designated service, wherein step e) is performed only when said designating service data of the second request message matches said at least one designated service.

4. The method according to claim 1, wherein steps a) and b) are accomplished by ad hoc exchanges.

5. The method according to claim 4, wherein designating service data includes data defining a first spatial value which is defined at any location within a restricted physical volume.

6. The method according to claim 1, wherein step c) and step d) are accomplished by ad hoc exchanges.

7. The method according to claim 1, wherein said second request message includes data defining a second spatial value which is defined at any location within a restricted physical volume.

8. The method according to claim 1, further comprising the step of:
   sending information to said portable user equipment (MS), after receiving the first request message.

9. The method according to claim 8, wherein said information comprises arrival time data relative to that one of the plurality of service stations which receives the second request message.

10. The method according to claim 8, wherein said information comprises advertising type information.

11. The method according to claim 8, wherein said information includes at least one Internet site address.

12. A use of the method according to claim 1, in the field of public transport, said mobile service providers (8) being public transport vehicles, in particular, buses and coaches, and the service station (3) constituting all or part of a bus stop.

13. The method according to claim 1, wherein the step f) of said mobile service provider is set off if the said mobile service provider is concerned by the stop request or else, if said mobile service provider is not concerned by the stop request, the method comprises the steps of generating and sending by said mobile service provider to said one service station a message informing that said mobile service provider is not concerned by the stop request.

14. The method according to claim 1, wherein the first request message and the second request message indicate a route and a direction related to the route.

15. The method according to claim 14, wherein further to the reception of said second request message by the mobile service provider in step f), if said mobile service provider is not configured for said route and or said direction indicated in the received second request message, a message is sent by the mobile service provider to the said one service station indicating that the mobile service provider is not concerned with the stop request.

16. A device for exchanging data between a portable user equipment MS, a plurality of service stations placed at selected locations and a plurality of mobile service providers (8), said device comprising:
   i) a memory, implanted in the portable user equipment MS;
   ii) a first short-range communication module intended to be arranged with each of the plurality of service stations which provides a first transmission zone, the portable user equipment being arranged with a compatible short-range communication module,
   iii) a second short-range communication module intended to be arranged with each of the plurality of service stations which provides a second transmission zone, each of said plurality of service stations being placed at selected locations along a route traversed by the mobile service providers and indicating where the mobile service providers can stop, and being provided with a compatible short-range communication module, iv) a first control module (2) intended to be implanted in the portable user equipment MS and to cooperate with the first compatible short-range communication module of said portable user equipment for:
   generating a first request message including designating service data and related to a stop request upon user's instruction, and
   transmitting the first request message to at least one of the plurality of service stations, wherein the plurality of service stations are placed at selected locations along a route traversed by the mobile service providers and indicate where the mobile service providers can stop, v) second control modules (7; 14) intended to be included at each of said plurality of service stations and cooperate with the first short-range communication module and said second compatible short-range communication module of such service station for:
   receiving the first request message when the first transmission zone contains the portable user equipment,
   generating a second request message including at least said designating service data related to the stop request, and
   transmitting the second request message, vi) third control modules intended to be implanted in each of the plurality of mobile service providers and cooperate with the second short-range communication module of such mobile service provider for:
   receiving the second request message related to the stop request when the second transmission zone contains that one of the plurality of service stations at which the second request message were generated, and
   so that one of the mobile service providers, depending on said second request received by the third control modules, stops at the service station contained in the second transmission zone of such mobile service provider.

17. The device according to claim 16, wherein the portable user equipment (MS) includes a communication module (1) and first control means.

18. The device according to claim 17, wherein the portable user equipment (MS) is chosen from a group including mobile telephones and personal digital assistants (PDA).

19. The device according to claim 16, wherein the service station (3) comprises: a communication module (6) and second control means (7).

20. The device according to claim 16, wherein the service station (3) is intended to be installed in a public place chosen from a group including bus or coach stops, airports and railway stations.

21. The device according to claim 16, wherein each of the mobile service providers are a transport vehicle having a communication module (9) and third control means (10).

22. The device according to claim 21, wherein the transport vehicle is arranged to provide public transport for persons.

23. The device according to claim 16, wherein first short-range communication modules, first control module, compatible short-range communication module of the user portable equipment and second control module are respectively arranged so as to generate and receive a first request message by ad hoc exchanges.

24. The device according to claim 23, wherein said first control means (2) are arranged to generate first request messages including a first spatial value data which is defined at any location within a restricted physical volume.

25. The device according to claims 16, wherein second short-range communication modules, second control module, compatible short-range communication module of the service station and third control module are respectively arranged so as to generate and receive a second request message by ad hoc exchanges.

26. The device according to claim 25, wherein said second control means (7) are arranged to generate second request messages including second spatial value data.

27. The device according to claim 16, wherein the first request message and the second request message indicate a route and a direction related to the route.

28. The device according to claim 27, wherein further to the reception of said second request message by the mobile service provider, if said mobile service provider is not configured for said route and or said direction indicated in the received second request message, a message is sent by the mobile service provider to the said one service station indicating that the mobile service provider is not concerned with the stop request.

* * * * *

UNITED STATES PATENT AND TRADEMARK OFFICE
CERTIFICATE OF CORRECTION

| | | |
|---|---|---|
| PATENT NO. | : 8,392,521 B2 | Page 1 of 1 |
| APPLICATION NO. | : 10/531291 | |
| DATED | : March 5, 2013 | |
| INVENTOR(S) | : Banatre et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,392,521 B2 | Page 1 of 1 |
| APPLICATION NO. | : 10/531291 | |
| DATED | : March 5, 2013 | |
| INVENTOR(S) | : Banatre et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this
Nineteenth Day of May, 2015

Michelle K. Lee
*Director of the United States Patent and Trademark Office*